(12) United States Patent
Neto et al.

(10) Patent No.: US 7,948,302 B2
(45) Date of Patent: May 24, 2011

(54) REGULATOR HAVING INTERLEAVED LATCHES

(75) Inventors: Fernando Zampronho Neto, Campinas (BR); Fernando Chavez Porras, Campinas (BR); Jon S. Choy, Austin, TX (US); Walter Luis Tercariol, Campinas (BR)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 12/555,227

(22) Filed: Sep. 8, 2009

(65) Prior Publication Data
US 2011/0057694 A1 Mar. 10, 2011

(51) Int. Cl.
*G05F 1/10* (2006.01)
(52) U.S. Cl. .......................................... 327/536; 363/60
(58) Field of Classification Search .................. 327/536; 363/59–60
See application file for complete search history.

(56) References Cited

U.S. PATENT DOCUMENTS

| | | | |
|---|---|---|---|
| 5,621,408 A | | 4/1997 | Cake et al. |
| 6,249,445 B1 * | | 6/2001 | Sugasawa .................. 363/60 |
| 6,498,737 B1 * | | 12/2002 | Kuo ............................ 363/59 |
| 6,806,761 B1 * | | 10/2004 | Aude .......................... 327/536 |
| 6,856,525 B2 * | | 2/2005 | Wallis ......................... 363/59 |
| 6,891,399 B2 * | | 5/2005 | Ngo et al. ................... 326/93 |
| 6,977,828 B2 * | | 12/2005 | Wada .......................... 363/60 |
| 7,279,959 B1 * | | 10/2007 | Choy .......................... 327/536 |
| 7,348,829 B2 | | 3/2008 | Choy et al. |
| 7,692,477 B1 * | | 4/2010 | Chen ........................... 327/534 |
| 7,755,417 B2 * | | 7/2010 | Suzuki ........................ 327/536 |
| 2004/0208026 A1 * | | 10/2004 | Kwon ......................... 363/59 |
| 2005/0168266 A1 * | | 8/2005 | Shin ............................ 327/536 |
| 2006/0164155 A1 | | 7/2006 | Ragone et al. |
| 2007/0069801 A1 | | 3/2007 | Ragone et al. |
| 2007/0069805 A1 * | | 3/2007 | Choi et al. .................. 327/536 |
| 2009/0237148 A1 * | | 9/2009 | Suzuki et al. ............... 327/536 |

OTHER PUBLICATIONS

U.S. Appl. No. 12/534,409, filed Aug. 3, 2009, Neto et al.

* cited by examiner

*Primary Examiner* — Thomas J Hiltunen

(57) ABSTRACT

A charge pump system (100) includes a charge pump (102), and a regulator (101) that includes a clock generator (120) for providing a clock signal, a control logic (130) coupled to the clock generator, and a comparator (140) coupled to an output of the charge pump. The comparator includes a plurality of interleaved latches (211, 212, 213 and 214) driven by a single differential (203) stage that compares the output voltage and a reference voltage. The control logic provides timing signals to cause each latch to perform a latch action at different points in time within each period of the clock signal, each point in time equally spaced apart. An output from each latch is coupled to an output stage (205). An output signal from the output stage regulates an output voltage from the charge pump. In one embodiment, the charge pump is coupled to a flash memory (190).

20 Claims, 6 Drawing Sheets

| NUMBER OF LATCHES | MAX DELAY TIME | OUTPUT VOLTAGE RIPLE | TIMING SCHEME |
|---|---|---|---|
| 2 | T | $\dfrac{2I_{LOAD}T}{C_{OUT}}$ | 0  T/4  T/2  3T/4  T<br>LATCH 1: P, S, L, L<br>LATCH 2: L, L, P, S |
| 3 | 2T/3 | $\dfrac{4I_{LOAD}T}{3C_{OUT}}$ | 0  T/3  2T/3  T<br>LATCH 1: S, L, P<br>LATCH 2: P, S, L<br>LATCH 3: L, P, S |
| 4 | T/2 | $\dfrac{I_{LOAD}T}{C_{OUT}}$ | 0  T/4  T/2  3T/4  T<br>LATCH 1: S, L, P, P<br>LATCH 2: P, S, L, P<br>LATCH 3: P, P, S, L<br>LATCH 4: L, P, P, S |
| 5 | 2T/5 | $\dfrac{2I_{LOAD}T}{5C_{OUT}}$ | 0  T/5  2T/5  3T/5  4T/5  T<br>LATCH 1: S, L, P, P, P<br>LATCH 2: P, S, L, P, P<br>LATCH 3: P, P, S, L, P<br>LATCH 4: P, P, P, S, L<br>LATCH 5: L, P, P, P, S |
| 6 | T/3 | $\dfrac{I_{LOAD}T}{3C_{OUT}}$ | 0  T/6  T/3  T/2  2T/3  5T/6  T<br>LATCH 1: S, L, P, P, P, P<br>LATCH 2: P, S, L, P, P, P<br>LATCH 3: P, P, S, L, P, P<br>LATCH 4: P, P, P, S, L, P<br>LATCH 5: P, P, P, P, S, L<br>LATCH 6: L, P, P, P, P, S |
| 7 | 2T/7 | $\dfrac{2I_{LOAD}T}{7C_{OUT}}$ | 0  T/7  2T/7  3T/7  4T/7  5T/7  6T/7  T<br>LATCH 1: S, L, P, P, P, P, P<br>LATCH 2: P, S, L, P, P, P, P<br>LATCH 3: P, P, S, L, P, P, P<br>LATCH 4: P, P, P, S, L, P, P<br>LATCH 5: P, P, P, P, S, L, P<br>LATCH 6: P, P, P, P, P, S, L<br>LATCH 7: L, P, P, P, P, P, S |

FIG. 6

REGULATOR HAVING INTERLEAVED LATCHES

BACKGROUND OF THE INVENTION

1. Field of the Invention

This invention relates generally to regulation of charge pumps, and more specifically to a skip-mode regulator for a charge pump.

2. Related Art

A charge pump delivers an output voltage $V_{OUT}$ at a desired value to a load that includes a load, or output, capacitance $C_{OUT}$. A charge pump regulator attempts to maintain $V_{OUT}$ at the desired value by selectively enabling and disabling the charge pump. The value of $V_{OUT}$ from a charge pump varies and has a maximum value and a minimum value. The maximum value occurs when $V_{OUT}$ overshoots a reference voltage $V_{REF}$ of the charge pump. The minimum value occurs when $V_{OUT}$ undershoots the reference voltage $V_{REF}$ of the charge pump. The response time of the regulator after overshoot (td_off) is defined as a maximum delay time for the regulator to disable the charge pump after $V_{OUT}$ becomes higher than $V_{REF}$. The response time of the regulator after undershoot (td_on) is defined as a maximum delay time for the regulator to enable the charge pump after $V_{OUT}$ becomes smaller than $V_{REF}$. The response time of the regulator (td_reg) is defined as the maximum delay time before the regulator disables the charge pump after $V_{OUT}$ becomes higher than $V_{REF}$ plus the maximum delay time before the regulator enables the charge pump after $V_{OUT}$ becomes smaller than $V_{REF}$. In other words, td_reg=td_off+td_on. Typically, td_on=td_off.

A difference between the maximum value and the minimum value of $V_{OUT}$ is defined as an output voltage ripple $V_{RIPPLE}$. In a charge pump regulator that uses latched comparators, output voltage ripple is directly proportional to a response time td_reg of the regulator and a current through the load $I_{LOAD}$, and inversely proportional to $C_{OUT}$. In other words, $V_{RIPPLE} \propto I_{LOAD} \cdot td\_reg/C_{OUT}$. As can be seen from the preceding equation, the output capacitance $C_{OUT}$ and the response time of the regulator td_reg affect the magnitude of the output voltage ripple; therefore, some known charge pumps reduce the magnitude of the output voltage ripple by increasing the output capacitance and/or decreasing the response time.

Because of the discrete sampling nature of a latched comparator, there is a possibility that the comparator does not latch a resolved signal during a first latching interval. Therefore, the result of a comparison is pushed out to a subsequent latching interval, which disadvantageously increases the magnitude of the overshoot or the undershoot of the output of the charge pump.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 6 illustrates a summary of the maximum delay time and output ripple voltage of the charge pump system of FIG. 1 when the comparator comprises each of various exemplary numbers of interleaved latches.

DETAILED DESCRIPTION OF EXEMPLARY EMBODIMENTS

Figure 1:
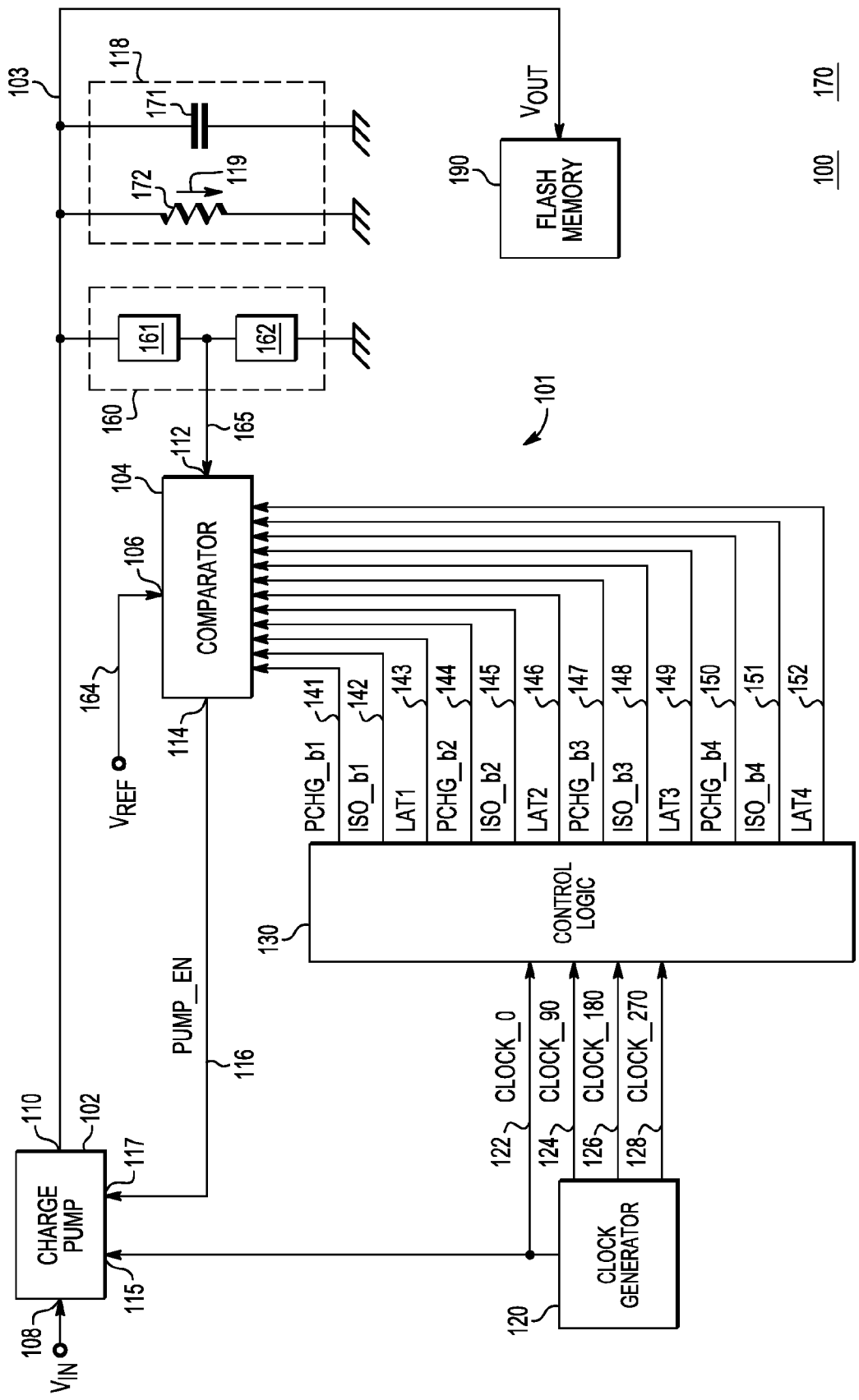
FIG. 1 is a simplified functional block diagram of a charge pump system, including a charge pump regulator that includes a comparator and control logic, in which the charge pump system is shown coupled to a flash memory.

FIG. 1 is a simplified functional block diagram of a charge pump system 100, including a charge pump 102 having an output voltage $V_{OUT}$ 103, and a charge pump regulator 101 (hereinafter "regulator") that controls a value of $V_{OUT}$. In one embodiment, the regulator 101 is a skip-mode regulator. The charge pump 102 provides an output voltage $V_{OUT}$ to a load 118. The regulator 101 maintains $V_{OUT}$ at a desired, or target, value by selectively enabling and disabling the charge pump 102. The charge pump 102 has an input 108 coupled to a voltage source $V_{IN}$, and an output 110 coupled to the load 118. A current through the load 118 is $I_{LOAD}$ 119.

The regulator 101 includes a clock generator 120 that outputs a clock_0 signal 122 to an input 115 of the charge pump 102. In one embodiment of the clock generator 120, the frequency of the clock_0 signal 122 is approximately 60 MHz. The regulator 101 also includes a comparator 104 and control logic 130 coupled to the clock generator 120 and to the comparator 104. The clock generator 120 outputs a plurality of equally-delayed secondary clock signals to the control logic 130. In one embodiment, the clock generator 120 outputs to the control logic 130 the clock_0 signal 122 and the following equally-delayed secondary signals: a clock_90 signal 124, a clock_180 signal 126 and a clock_270 signal 128. In general, the clock generator 120 outputs n−1 secondary clock signals, each secondary clock signal phase shifted by 360/n degrees from the clock_0 signal 122 and from each other, where n is a number of latches in the plurality of latches.

The control logic 130 outputs a plurality of control, or timing, signals 141-152 to the comparator 104. The comparator 104 has an input 106 coupled to a reference voltage $V_{REF}$ 164, and an output 114 coupled to an input 117 of the charge pump 102. In one embodiment, $V_{REF}$ 164 is approximately 0.8V.

The charge pump system 100 includes a voltage translation circuit 160 comprising voltage divider elements 161 and 162. An output of the voltage translation circuit 160 is coupled to an input 112 of the comparator 104. In one embodiment, the voltage divider elements 161 and 162 are resistors, $R_1$ and $R_2$, respectively, and the voltage translation circuit 160 outputs a signal $V_{OUT\_SCALED}$ 165, such that $V_{OUT\_SCALED} = V_{OUT} R_2 / R_1 + R_2$. In another embodiment, the voltage divider elements 161 and 162 are capacitors, $C_1$ and $C_2$, respectively, and the voltage translation circuit 160 outputs a signal $V_{OUT\_SCALED}$ 165, such that $V_{OUT\_SCALED} = V_{OUT} C_2 / C_1 + C_2$. In one embodiment, the values of the voltage divider elements 161 and 162 are selected such that when $V_{OUT}$ is 4.2V, $V_{OUT\_SCALED}$ is approximately 0.8V. The comparator 104 compares $V_{OUT\_SCALED}$ 165 (which is proportional to $V_{OUT}$ 103) to $V_{REF}$ 164.

The load 118 comprises a load capacitor, or output capacitor $C_{OUT}$, 171 and a resistive component 172. The load 118 may also comprise an inductive component (not shown). The comparator 104 has an output 114 coupled to an input 117 of the charge pump 102. The comparator 104 outputs a PUMP_EN signal 116 to the charge pump 102. In one embodiment, the charge pump system 100 is contained within an integrated circuit 170.

Figure 2:
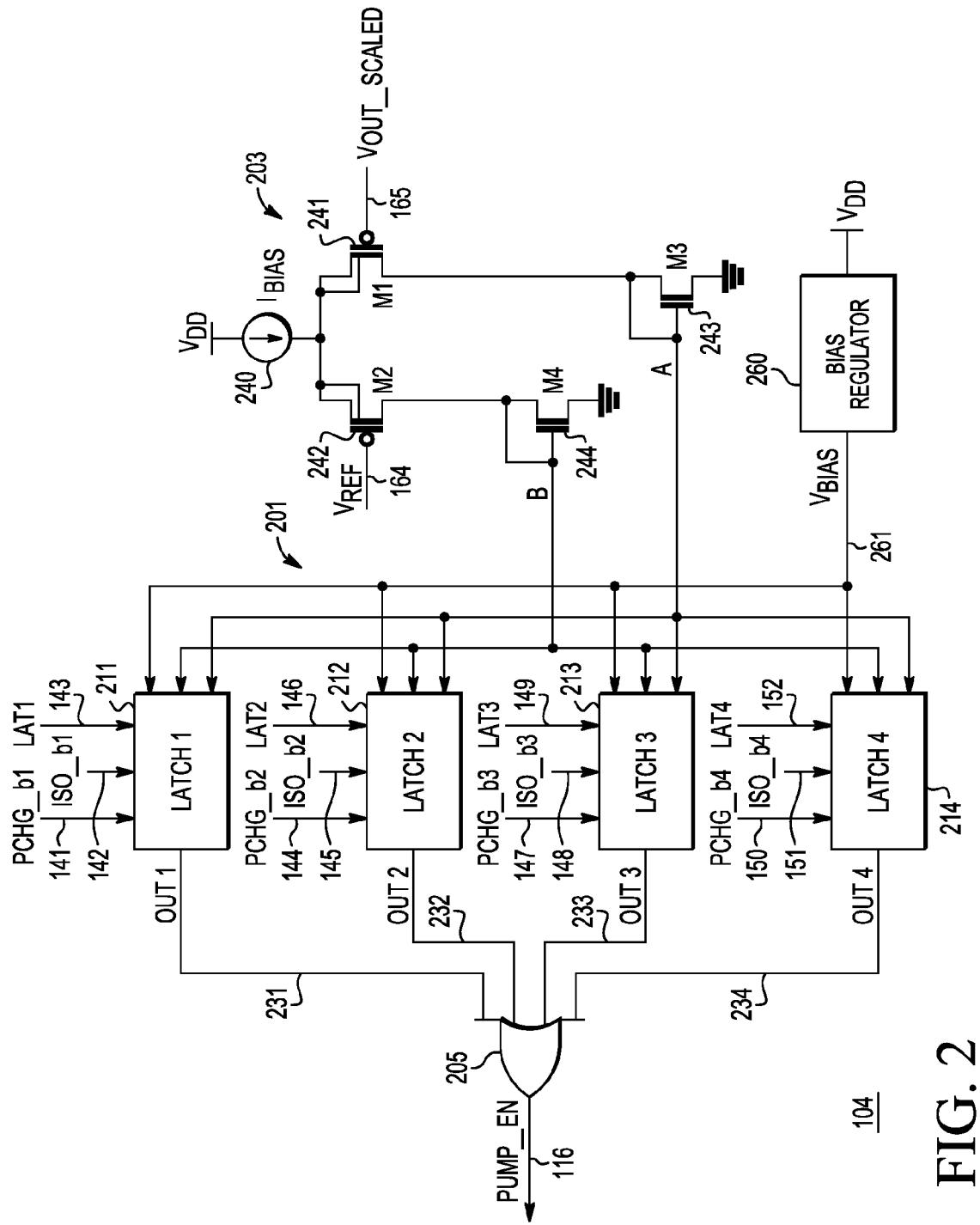
FIG. 2 is a simplified functional block diagram of one embodiment of the comparator that has four interleaved latches.

FIG. 2 is a simplified functional block diagram of one embodiment of the comparator 104 that has four (4) interleaved latches. The PUMP_EN signal 116 that the comparator 104 outputs is responsive to whether $V_{REF}$ 164 is greater than or less than $V_{OUT\_SCALED}$ 165. In the illustrated embodiment, the PUMP_EN signal 116 is a logic level "0" when $V_{OUT\_SCALED}$ 165 is greater than $V_{REF}$ 164 and is a logic level "1" when $V_{OUT\_SCALED}$ is less than $V_{REF}$. The comparator 104 comprises a latch stage 201, a differential stage 203 and an output stage 205. The latch stage 201 includes a plurality of interleaved latches. The term "interleaved latches" means that the latches have comparison cycles that are temporally offset from each other. In one embodiment, the interleaved latches have comparison cycles that are equally temporally offset from each other. The latch stage 201 of one embodiment of the comparator 104 comprises four (4) interleaved latches 211, 212, 213 and 214. The latches 211, 212, 213 and 214 are coupled to a single differential stage 203 in a parallel arrangement, and each latch is driven by the differential stage 203 during a different portion of each period of the clock_0 signal 122. The comparison cycles of latches 211, 212, 213 and 214 are temporally offset from each other by one quarter of a period of the clock_0 signal 122, i.e., by T/4. In the one embodiment of the regulator 101 in which the frequency of the clock_0 signal 122 is approximately 60 MHz, the comparison cycles of latches 211, 212, 213 and 214 are temporally offset from each other by approximately 4 ns. The timing of the latches 211, 212, 213 and 214 is controlled by the control logic 130. Each latch has three (3) inputs for receiving timing signals from the control logic 130. Each latch has two (2) inputs for receiving signals from the differential stage 203. Each latch has an input for receiving a $V_{BIAS}$ signal from the bias regulator 260. Each latch has an output coupled to the output stage 205. The latches 211, 212, 213 and 214 should not have a significant amount of kickback noise. An example of a latch that can be used with the comparator 104 is described in U.S. application Ser. No. 12/534,409, entitled LATCHED COMPARATOR WITH REDUCED KICKBACK AND METHODS THEREFOR, by Neto et al., filed Aug. 3, 2009, which is assigned to the assignee of the present invention, and which is hereby fully incorporated herein.

The differential stage 203 of the comparator 104 compares $V_{OUT\_SCALED}$ 165 to $V_{REF}$ 164. The differential stage 203 of the comparator 104 comprises a differential pair of transistors 241 and 242 and their respective current minors 243 and 244. In one embodiment, the differential stage 203 includes a current source 240 having a first terminal coupled to $V_{DD}$. In another embodiment, the differential stage 203 is coupled to and powered by $V_{IN}$ instead of $V_{DD}$, so that power is not taken from the output 110 of the charge pump 102. The differential stage 203 includes a P-channel metal oxide semiconductor (PMOS) transistor 241 having a first current electrode coupled to a second terminal of current source 240 and a PMOS transistor 242 having a first current electrode coupled to the second terminal of current source 240. A control electrode of transistor 241 receives the signal $V_{OUT\_SCALED}$ 165 and a control electrode of transistor 242 receives the signal $V_{REF}$ 164. The differential stage 203 includes an N-channel metal oxide semiconductor (NMOS) transistor 243 having a first current electrode coupled to a second current electrode of transistor 241 and coupled to a control electrode of transistor 243. A second current electrode of transistor 243 is coupled to ground. The differential stage 203 includes an NMOS transistor 244 having a first current electrode coupled to a second current electrode of transistor 242 and coupled to a control electrode of transistor 244. A second current electrode of transistor 244 is coupled to ground. The second current electrode of PMOS transistor 241 constitutes an "A" output of the differential stage 203, and the "A" output is coupled to an input of each latch 211, 212, 213 and 214. The second current electrode of PMOS transistor 242 constitutes a "B" output of the differential stage 203, and the "B" output is coupled to another input of each latch. The "A" output and the "B" output of the differential stage 203 change at each occasion that the value of $V_{REF}$ 164 crosses the value of $V_{OUT\_SCALED}$ 165. The differential stage 203 of the comparator 104 continuously compares $V_{OUT\_SCALED}$ 165 with $V_{REF}$ 164, and continuously provides an "A" output and a "B" output to the latches 211, 212, 213 and 214. The "A" output is the opposite of the "B" output, i.e., when the "A" output is high, the "B" output is low, and vice versa.

Each latch 211, 212, 213 and 214 is configured to latch a value, based on a comparison of the "A" output and the "B" output from the differential stage 203. Control, or timing, signals PCHG_b1 141, ISO_b1 142 and LAT1 143 from the control logic 130 determine when latch_1 211 samples the signals at the "A" output and the "B" output. Other, analogous, timing signals 144-152 from the control logic 130 determine when latch_2 212, latch_3 213 and latch_4 214 sample the signals at the "A" output and the "B" output. Because of the discrete sampling performed by the latch stage 201 of the comparator 104, the comparator updates the PUMP_EN signal 116 four (4) times per period of the clock_0 signal, for the embodiment shown in FIG. 2.

The output stage 205 of the comparator 104 comprises one logic gate. An advantage of the output stage 205 having only one logic gate is that the output stage then contributes minimally to a delay time of the comparator 104. The type of logic gate used (e.g., OR, NOR, NAND or AND) depends, inter alia, on the type of PUMP_EN signal 116 used with the charge pump 102 (i.e., if the charge pump is turned on with a high level or with a low level of the PUMP_EN signal), and on the signal 231-234 outputted by the latches 211, 212, 213 and 214 (i.e., an OUT signal or an OUT_b signal). For the embodiment of the comparator 104 shown in FIG. 2, an OR gate is used as the output stage 205. Output signals OUT1 231, OUT2 232, OUT3 233 and OUT4 234 from latches 211, 212, 213 and 214, respectively, are fed into the output stage 205.

It is advantageous that the capacitance of $C_{OUT}$ 171 be as low as feasible because the area that a capacitor occupies is proportional to its capacitance. In one embodiment, the charge pump system 100 is in an integrated circuit, and it is particularly advantageous that a capacitor in an integrated circuit occupy as small of an area as possible. Use of the plurality of latches 211, 212, 213 and 214 in the comparator 104 reduces a response time of the regulator 101, which decreases its output voltage ripple without having to increase the value of $C_{OUT}$ 171. In one embodiment of the regulator 101, in which the latch stage 201 has four (4) latches, the value of $C_{OUT}$ 171 is only approximately 500 pF. The value of the output capacitor of at least one known skip-mode regulator is disadvantageously high at 925 pF. One advantage of the comparator 104 is that the area of charge pump system 100 can be reduced by reducing $C_{OUT}$ 171 without the output voltage ripple increasing.

If the number of latches in the latch stage 201 is increased (e.g., to greater than four), the value of $C_{OUT}$ 171 can be reduced (e.g., to less than 500 pF, which reduces the area occupied by $C_{OUT}$ in the integrated circuit), and still maintain a same output voltage ripple. It should be noted that any increase in the area of the circuitry of the comparator 104 (due to an increase in the number of latches) is more than counteracted by the decrease in the area of $C_{OUT}$ 171 that is needed to maintain a same output voltage ripple. Alternatively, the greater the number of latches in the latch stage 201, the more that the output voltage ripple is reduced, while maintaining a same value of $C_{OUT}$ 171. In one embodiment of the regulator 101, the output voltage ripple is approximately 30 mv, when $C_{OUT}$ 171 is approximately 500 pF. At least one known skip-mode regulator has a disadvantageously high output voltage ripple of approximately 50 mv, when $C_{OUT}$ 171 is approximately 500 pF. Use of the plurality of latches 211, 212, 213 and 214 permits the comparator 104 to perform more comparisons during each clock cycle, thus resulting in reduction of the response time of the regulator 101. This reduction is accomplished without increasing the clock frequency for the latches 211, 212, 213 and 214. The comparator 104 has a number of latches equal to a number of comparisons per clock cycle. The comparator 104 includes a bias regulator 260 having an input $V_{DD}$ and having an output $V_{BIAS}$ 261 coupled to the latches 211, 212, 213 and 214. Advantageously, the comparator 104 performs interleaved comparisons without requiring a separate differential pair for each latch 211, 212, 213 and 214. Compared to known skip-mode regulators, the regulator 101 produces a smaller and a more homogeneous output voltage ripple. The regulator 101 has a faster response time td_reg than known skip-mode regulators. In one embodiment, each of the latches 211, 212, 213 and 214 are identical. In the one embodiment in which the frequency of the clock_0 signal 122 is approximately 60 MHz, each latch 211, 212, 213 and 214 is selected so that its input-to-output response time, or delay time, is at most approximately 16 ns.

Figure 3:
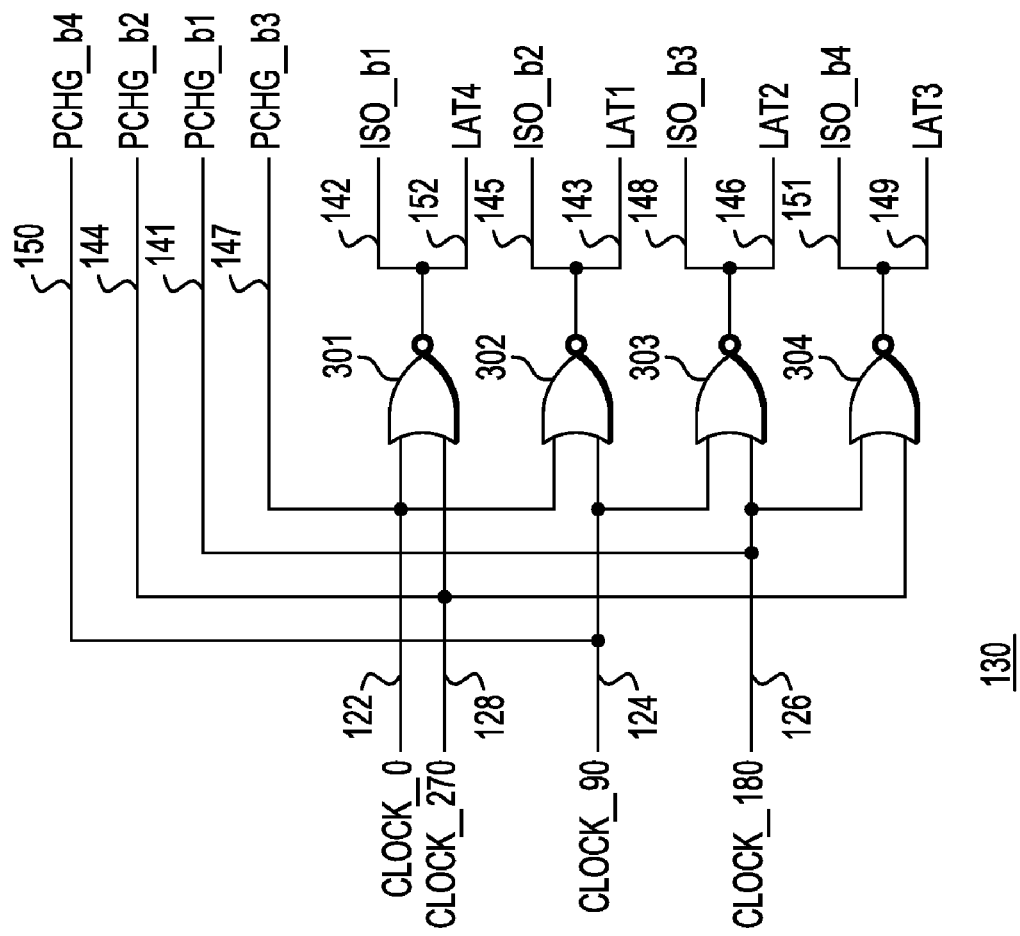
FIG. 3 is a simplified schematic of one embodiment of the control logic for the embodiment of the comparator shown in FIG. 2.

FIG. 3 is a simplified schematic of one embodiment of the control logic 130 for use with the one embodiment of the comparator 104 shown in FIG. 2. The control logic 130 comprises a first NOR gate 301 that receives the CLOCK_0 and the CLOCK_270 signals from the clock generator 120; a second NOR gate 302 that receives the CLOCK_0 and CLOCK_90 signals from the clock generator 120; a third NOR gate 303 that receives the CLOCK_90 and the CLOCK_180 signals from the clock generator 120; and a fourth NOR gate 304 that receives the CLOCK_180 and the CLOCK_270 signals from the clock generator 120. FIG. 3 shows the signals generated by the control logic 130.

Figure 4:
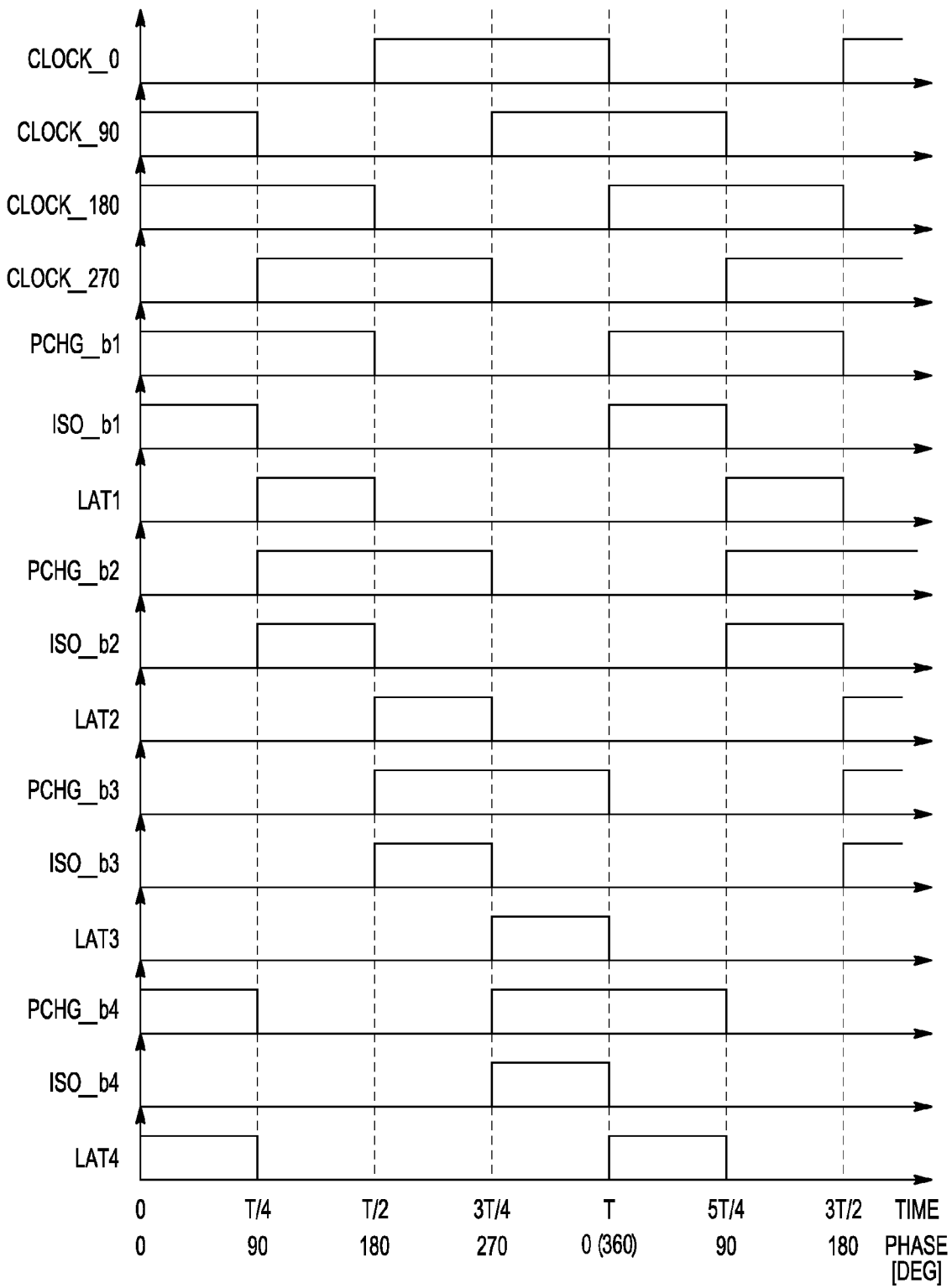
FIG. 4 is a timing diagram for signals present in FIGS. 1, 2 and 3.

FIG. 4 is a timing diagram showing the signals inputted into the control logic 130 and outputted by the control logic for the embodiment of the control logic shown in FIG. 3, over an interval of approximately 1½ periods of the clock_0 signal 122.

Each latch 211, 212, 213 and 214 performs three (3) actions, a pre-charge (PCHG) action; an isolation (ISO) action, sometimes referred to as a settle action or a compare action; and a latch (LAT) action. A comparison cycle may start with the pre-charge action during which the output of one of the latches is reset; next, a comparison takes place during the isolation action; and finally, the output of the latch is updated with the previous comparison during the latch action.

Figure 5:
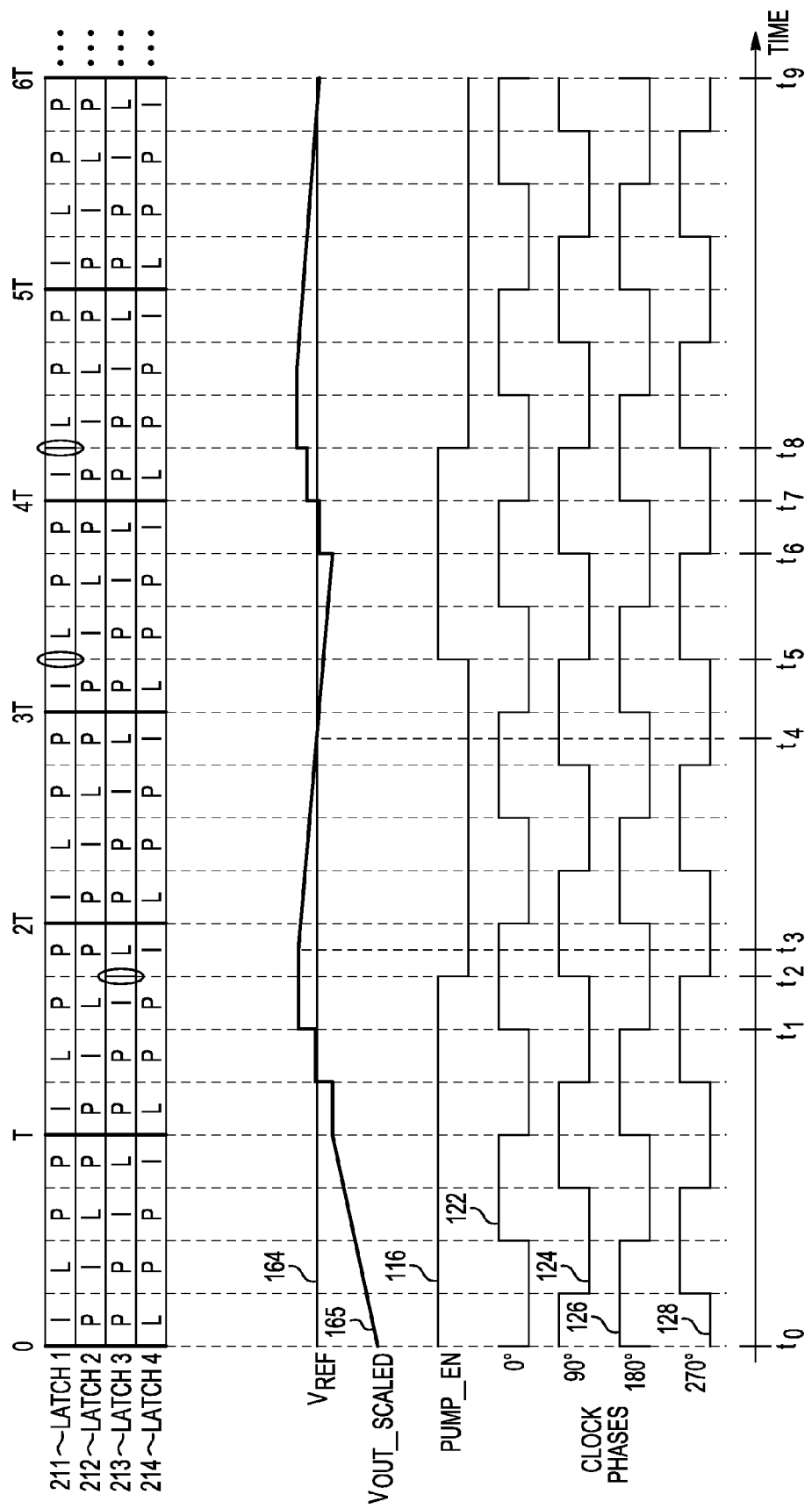
FIG. 5 illustrates operation of the charge pump system of FIG. 1 having the one embodiment of the comparator shown in FIG. 2 and the one embodiment of the control logic shown in FIG. 3.

FIG. 5 illustrates operation of the charge pump system 100 having the one embodiment of the comparator 104 shown in FIG. 2 and the one embodiment of the control logic 130 shown in FIG. 3. FIG. 5 illustrates operation of the charge pump system 100 during six (6) periods of the clock_0 signal 122. In FIGS. 5 and 6, the names of the actions are abbreviated as follows: the pre-charge (P) action, the isolation (I) action and the latch (L) action. FIG. 5 shows six (6) comparison cycles performed by four (4) latches. Each latch performs four (4) actions during each period T. All the latches repeatedly perform a same sequence of four actions, but offset in time from each other by T/4. Therefore, in any one clock period, each latch performs a set of four actions that is different from the sets of four actions performed by the other latches. For example, latch_1 211 performs the four actions, I, L, P and P, during a first comparison cycle; however, latch_2 212 performs the four actions, P, I, L and P, during the first comparison cycle. The timing of the operation of the latches 211, 212, 213 and 214 is dictated by the signals from the control logic 130. The signal $V_{REF}$ 164 is a fixed voltage. The signal $V_{OUT\_SCALED}$ 165 is a voltage that tracks the voltage $V_{OUT}$ 103. The voltage $V_{OUT}$ 103 varies in response to the load current $I_{LOAD}$ 119. When the value of $V_{OUT\_SCALED}$ 165 is less than the value of $V_{REF}$ 164, the comparator 104 of the regulator 101 outputs a high PUMP_EN signal 116 to the charge pump 102, thereby enabling the charge pump. The charge pump 102 is enabled by the PUMP_EN signal 116 until $V_{OUT\_SCALED}$ 165 reaches the voltage level of $V_{REF}$ 164, and is disabled when $V_{OUT\_SCALED}$ is above the voltage level of $V_{REF}$. The determination of whether the voltage level of $V_{OUT\_SCALED}$ 165 is above or below the voltage level of $V_{REF}$ 164 is made by the differential stage 203 of the comparator 104.

At time $t_0$, the signal $V_{OUT\_SCALED}$ 165 is less than the signal $V_{REF}$ 164. In response thereto, the comparator 104 outputs a high PUMP_EN signal 116, thereby causing $V_{OUT}$ 103 and $V_{OUT\_SCALED}$ 165 to increase in value. The comparator 104 continues to output a high PUMP_EN signal 116 during the time that $V_{OUT\_SCALED}$ 165 remains less than $V_{REF}$ 164. The signal $V_{OUT\_SCALED}$ 165 becomes very slightly larger than $V_{REF}$ 164 approximately 4 ns prior to time $t_1$. However, if a resolution voltage of the differential stage 203 of the comparator 104 is greater than a voltage difference at its inputs, the comparator will not be able to respond to such small voltage difference; therefore, comparator waits until the voltage difference increases before the differential stage can notice the voltage difference. At time $t_1$, $V_{OUT\_SCALED}$ 165 becomes higher than $V_{REF}$ 164. In response thereto, the comparator 104 begins to output, at time $t_2$, a low PUMP_EN signal 116. The comparator 104 begins to output the low PUMP_EN signal 116 at time $t_2$ because it is not until time $t_2$ that one of the latches next performs a LAT action. In this instance, latch_3 213 is the first latch of the plurality of latches 211, 212, 213 and 214 that next performs a LAT action. A difference between $t_1$ and $t_2$ is a td_off response time. For the embodiment of the comparator 104 shown in FIG. 2 and the embodiment of the control logic 130 shown in FIG. 3, td_off is merely T/4. In the one embodiment of the regulator 101 in which each latch 211, 212, 213 and 214 has an input-to-output response time, or delay time, of approximately 16 ns, the td_off response time of the regulator is approximately 4 ns. Advantageously, the response time of the regulator 101 can be relatively fast (e.g., 4 ns) notwithstanding the fact that it comprises latches 211, 212, 213 and 214 that have relatively slow individual response times (e.g., 16 ns). The signal $V_{OUT\_SCALED}$ 165 starts to reduce in value at time t3, but remains above the signal $V_{REF}$ 164 until time $t_4$.

In response to $V_{OUT\_SCALED}$ 165 going below $V_{REF}$ 164 at time $t_4$, the comparator 104 begins to output, at time $t_5$, a high PUMP_EN signal 116. The comparator 104 begins to output the high PUMP_EN signal 116 at time $t_5$ because it is at time $t_5$ that one of the latches next performs a LAT action. In this instance, latch_1 211 is the first latch of the plurality of latches 211, 212, 213 and 214 that next performs a LAT action. A difference between $t_4$ and $t_5$ is a td_on response time. For the embodiment of the comparator 104 shown in FIG. 2 and the embodiment of the control logic 130 shown in FIG. 3, td_off is less than T/2. This illustrates a nearly worst-case scenario because $t_4$ occurs too late during the ISO interval of latch_4 214 for latch_4 to cause the comparator 104 to output a high PUMP_EN signal 116. However, even in this nearly worst-case scenario, the td_off response time is increased by merely T/4 over a best-case scenario. (For the best case scenario, the td_off response time is T/4). The current through the load, $I_{LOAD}$ 119, and therefore the value of $V_{OUT}$ 103, has no synchronization with the comparison cycles of the latches 211, 212, 213 and 214. Therefore, the output voltage ripple assumes a random behavior in time, with a maximum output voltage ripple determined by the maximum possible delay time for turning on the charge pump 102 and by the maximum possible delay time for turning off the charge pump. For the embodiment of the comparator 104 having four (4) latches in the latch stage 201, the maximum delay time of the regulator 101 is only T/2, even during a worst-case scenario.

At time $t_6$, the value of $V_{OUT\_SCALED}$ 165 begins to increase again, in steps, as a result of the PUMP_EN signal 116 being high. At time $t_7$, $V_{OUT\_SCALED}$ 165 again becomes higher than $V_{REF}$ 164. From $t_7$ to $t_8$ the voltage difference between $V_{OUT\_SCALED}$ 165 and $V_{REF}$ 164 is large enough to be noticed by the differential stage 203 of the comparator 104. In response thereto, the comparator 104 outputs, at time $t_8$, a low PUMP_EN signal 116. The comparator 104 begins to output the low PUMP_EN signal 116 at time $t_8$ because it is at time $t_8$ that one of the latches next performs a LAT action. In this particular instance, it just so happens that latch_1 211, again, is the first latch of the plurality of latches 211, 212, 213 and 214 that next performs a LAT action subsequent to time $t_7$. In general, any latch of the plurality of latches could be the next latch to enter a LAT interval after time $t_7$. A difference between $t_7$ and $t_8$ is a td_off response time. Advantageously, for the embodiment of the comparator 104 shown in FIG. 2 and the embodiment of the control logic 130 shown in FIG. 3, td_off is only T/4. The signal $V_{OUT\_SCALED}$ 165 remains above the signal $V_{REF}$ 164 until at least time $t_9$. The four (4) ellipses at the right side of FIG. 5 signify that each latch 211, 212, 213 and 214 continues to repeat the same sequence of four actions while the regulator 101 is operating.

The response time of the comparator 104 can be decreased by increasing the number of interleaved latches operating during one clock period. In one embodiment, the comparator 104 has four (4) comparison cycles equally delayed during one clock period such that there are four (4) operational functions, or actions, occurring during a single clock period. In general, the comparator 104 has m comparison cycles equally delayed during one clock period such that there are m actions occurring during a single clock period. The design of the comparator 104 can be generalized to comprise a matrix of n latches and m intervals, where m=n. The rows of the matrix correspond to the latches and the columns of the matrix correspond to the intervals. Each term $X_{ij}$ of the matrix (where i=latch number and j=interval number) corresponds to an action that a particular latch is performing during a particular interval. The following steps are performed to fill the terms $X_{ij}$ of the matrix for optimizing the timing scheme of the comparator 104, for simplifying the control logic 130 and for simplifying the output stage 205: 1) setting m=n (number of latches equal to the number of intervals); 2) filling a main diagonal of the matrix with ISO actions; 3) filling the terms $X_{m,\ m+1}$ and $X_{n,\ 1}$ with LAT actions; 4) maintaining the operation sequence of the latch as: PCH, ISO and LAT; 5) filling the remaining terms with PCH actions. The preceding steps for producing the matrix are valid only for n≧3. The matrix for a comparator 104 having two (2) interleaved latches, i.e., when n=2, is depicted in FIG. 6. For the embodiment of the comparator 104, shown in FIGS. 2 and 3, and whose operation is shown in FIG. 5, m=n=4.

FIG. 6 illustrates a summary of the maximum delay time and the output voltage ripple of the charge pump system 100 when the comparator 104 comprises each of various exemplary numbers of interleaved latches. FIG. 6 illustrates a summary of the maximum delay time and the output voltage ripple of the charge pump system 100 when the comparator 104 comprises 2, 3, 4, 5, 6 and 7 interleaved latches. FIG. 6 shows a comparison cycle for a comparator 104 comprising seven (7) latches. Each latch performs seven (7) actions during each period T. All seven (7) of the latches repeatedly perform a same sequence of seven actions, but offset in time from each other by T/7; therefore, in any one clock period, each latch performs a unique set of seven actions. For example, latch_1 performs the seven actions, S, L, P, P, P, P and P, during a first comparison cycle. However, latch_2 performs the seven actions, P, S, L, P, P, P and P, during the first comparison cycle; and latch_7 performs the seven actions, L, P, P, P, P, P and S, during the first comparison cycle. During a second comparison cycle (not shown), latch_1 performs, again, the seven actions, S, L, P, P, P, P and P; latch_2 performs, again, the seven actions, P, S, L, P, P, P and P; and latch_7 performs, again, the seven actions, L, P, P, P, P, P and S. With the embodiment of the comparator 104 having seven (7) latches, the maximum delay time of the regulator 101 is 2T/7 and the output voltage ripple is $2I_{LOAD}T/7C_{OUT}$. The control logic 130 causes each latch of the plurality of latches to perform an ISO action during a different portion of the period of the clock_0 signal 122. Similarly, the control logic 130 causes each latch of the plurality of latches to perform a LAT action during a different portion of the period of the clock_0 signal 122. During any T/n portion of the clock_0 signal 122, where T is the period of the clock_0 signal, and n is the number of latches, only one latch of the plurality of latches performs the ISO and LAT actions. Although FIG. 6 only illustrates embodiments of the comparator 104 having up to seven (7) latches, other embodiments of the comparator can have a number of latches greater than seven.

The maximum delay time to either turn on the charge pump 102 (td_on) or to turn off the charge pump (td_off) obeys the equation td≈2T/n; where n is the number of interleaved latches and T is the clock cycle. On the other hand, the output voltage ripple obeys the equation $V_{RIPPLE} \cong (2*I_{LOAD}*td)/C_{OUT}$, where $I_{LOAD}$ is a current through the load 118, td_reg is the response time of the regulator 101 (assuming td_on≅td_off=td_reg), and $C_{OUT}$ 171 is the capacitance coupled to the output of the charge pump 102.

Advantageously, the comparator 104 does not require a leading edge circuit that is needed in some known skip-mode regulators. The leading edge circuit of some known skip-mode regulators comprises a plurality of logic gates forming combinatorial and/or sequential logic circuits that disadvantageously increase the delay time of such known skip-mode regulators.

In a first embodiment of the charge pump system 100, the output 110 of the charge pump 102 is coupled to a flash memory 190, and $V_{OUT}$ 103 is used to read from the flash memory 190, wherein $V_{OUT}$ has a value of approximately +4.2 v.

In a second embodiment of the charge pump system 100, the output 110 of the charge pump 102 is coupled to the flash memory 190, and $V_{OUT}$ 103 is used to erase the flash memory, wherein $V_{OUT}$ has a value of approximately −8.5 v. To write to the flash memory 190, third and fourth embodiments of the charge pump system 100 are coupled to the flash memory. In the third embodiment of the charge pump system 100, the output 110 of the charge pump 102 is coupled to a drain of a bit cell of the flash memory, wherein $V_{OUT}$ 103 for the third embodiment has a value of approximately +5.4V. In the fourth embodiment of the charge pump system 100, the output 110 of the charge pump 102 is coupled to a gate of the bit cell of the flash memory, wherein $V_{OUT}$ 103 for the fourth embodiment has a value of approximately +8.5V.

In another embodiment (not shown), the output from each latch 211, 212, 213 and 214 is coupled to one of four (4) charge pumps that are in parallel to each other, which act, collectively, as a single, monolithic charge pump, with their outputs coupled together. In yet another embodiment (not shown), the outputs from two (2) of the four (4) latches 211, 212, 213 and 214 are coupled to a first charge pump, and the outputs from the other two (2) latches are coupled to a second charge pump, wherein the first and second charge pumps are in parallel to each other, and the outputs of the first and second charge pumps are coupled together.

Although the invention has been described with respect to specific conductivity types or polarity of potentials, skilled artisans appreciated that conductivity types and polarities of potentials may be reversed.

It should be understood that all circuitry described herein may be implemented in hardware, in software or in firmware, or in any combination of the three. It should be understood that all circuitry described herein may be implemented entirely in silicon or another semiconductor material. Alternatively, all circuitry described herein may be implemented, in part, in silicon or another semiconductor material, and, in part, by software code representation of silicon or another semiconductor material.

Although the invention is described herein with reference to specific embodiments, various modifications and changes can be made without departing from the scope of the present invention as set forth in the claims below. For instance, although the exemplary embodiments show that the charge pump system 100 is used with the flash memory 190, the charge pump system can be used with other circuits, as well. Additionally, although the exemplary embodiments show that the charge pump system 100 and the flash memory 190 are disposed on a same integrated circuit 170, they can be on separate integrated circuits. Although the exemplary embodiments show that the regulator 101 is disposed on an integrated circuit, the regulator can also be constructed entirely of components consisting of discrete devices. Although the exemplary embodiments show that the comparator 104 comprises FETs, some or all of the transistors of the comparator can be bipolar junction transistors. Although, in one exemplary embodiment, the regulator 101 is disposed on an integrated circuit fabricated using CMOS technology, the regulator can also be disposed on an integrated circuit fabricated using other technologies.

The specification and figures are to be regarded in an illustrative rather than a restrictive sense, and all such modifications are intended to be included within the scope of the present invention. Any benefits, advantages or solutions to problems described herein with regard to specific embodiments are not intended to be construed as a critical, required or essential feature or element of any or all the claims. Unless stated otherwise, terms such as "first" and "second" are used to arbitrarily distinguish between the elements such terms describe. Thus, these terms are not necessarily intended to indicate temporal or other prioritization of such elements. Note that the term "couple" has been used to denote that one or more additional elements may be interposed between two elements that are coupled.

What is claimed is:

1. A charge pump system, comprising:
    a charge pump having an input for receiving a clock signal, another input for receiving an input voltage, and an output for providing an output voltage; and
    a regulator for regulating the output voltage, the regulator comprising:
    a reference voltage terminal for providing a reference voltage; and
    a comparator having a first input coupled to the reference voltage terminal, a second input coupled to the output of the charge pump, and an output, the comparator including:
    a differential stage, the differential stage having an input coupled to the reference voltage terminal, another input coupled to the output of the charge pump, and an output,
    a control logic for providing a plurality of secondary clock signals derived from the clock signal, each secondary clock signal phase shifted from the clock signal and from other secondary clock signals,
    a plurality of interleaved latches, each latch having an input coupled to the output of the differential stage, one latch of the plurality of interleaved latches having a clock input for receiving the clock signal, each of the other latches of the plurality of interleaved latches having a clock input for receiving one of the secondary clock signals, each latch having an output, and
    an output stage having a plurality of inputs, each coupled to the output of each latch, the output stage providing an enable signal to the charge pump in response to outputs of the plurality of latches.

2. The charge pump system of claim 1, wherein the outputs of the plurality of latches are responsive to a value of the output voltage of the charge pump relative to the value of the reference voltage.

3. The charge pump system of claim 2, wherein each secondary clock signal is phase shifted from the clock signal and from the other secondary clock signals by a same amount of phase shift.

4. The charge pump system of claim 3, wherein each secondary clock signal is phase shifted by 360/n degrees from the clock signal and from other secondary clock signals, where n is a number of latches in the plurality of latches.

5. The charge pump system of claim 1, further comprising a voltage translation circuit coupled between the output of the charge pump and the second input of the comparator, the voltage translation circuit reducing values of the output voltage provided by the charge pump.

6. The charge pump system of claim 5, further comprising a load coupled to the output of the charge pump, wherein the load includes a capacitance.

7. The charge pump system of claim 1, wherein the output of each latch provides, at different times, an indication that an output voltage of the charge pump is above or below a target value for the output voltage.

8. The charge pump system of claim 7, wherein each latch is clocked by one of the plurality of secondary clock signals once within each cycle of the clock signal and at a different point in time from points in time that the other latches are clocked.

9. The charge pump system of claim 1, wherein each latch is capable of a pre-charge action, an isolation action, and a latch action, wherein each latch performs the latch action during a different portion of a period of the clock signal.

10. The charge pump system of claim 1, wherein after detection of an overshoot of the output voltage of the charge pump above a target value, the differential stage changes its output.

11. The charge pump system of claim 10, wherein after detection of an overshoot of the charge pump above the target value, the regulator provides a signal to disable operation of the charge pump.

12. The charge pump system of claim 1, wherein after detection of an undershoot of the output voltage of the charge pump below a target value, the differential stage changes its output.

13. The charge pump system of claim 12, wherein after detection of an undershoot of the charge pump below the target value, the regulator provides a signal to enable operation of the charge pump.

14. A regulator for a charge pump comprising:
   a single comparison circuit for comparing a reference voltage and a present value of an output voltage of the charge pump, the single comparison circuit having at least one output responsive to a comparison;
   a plurality of interleaved latches, coupled to the single comparison circuit, each latch having at least one input coupled to the at least one output of the single comparison circuit, each latch capable of a pre-charge action, an isolation action, and a latch action, each latch having an output, wherein each latch performs a latch action at a different point in time from points in time that other latches perform a latch action, and wherein outputs of the latches are responsive to the output of the single comparison circuit at a different points in time; and
   an output stage having an plurality of inputs and having an output, the output of each latch coupled to one input of the plurality of inputs of the output stage, the output of the output stage coupled the charge pump, wherein the output of the output stage regulates an output voltage of the charge pump.

15. The regulator of claim 14, wherein the output stage consists of one of: an OR gate, an AND gate, a NOR gate and a NAND gate.

16. An integrated circuit, comprising:
   a charge pump including a regulator, the regulator comprising:
      a single differential circuit coupled to the charge pump for comparing an output of the charge pump and a reference value;
      a plurality of interleaved latches, each latch coupled to the at least one output of the single differential circuit, each latch capable of a pre-charge action, an isolation action, and a latch action, each latch having an output coupled to the charge pump, wherein each latch performs an action at a different point in time from points in time that other latches perform the same action, and wherein outputs of the latches are responsive to the output of the single differential circuit at a different points in time; and
      a control logic, coupled to a clock generator and to each latch, for providing timing signals to each latch, such that operation of the plurality of latches is interleaved,
      wherein outputs from the plurality of latches regulate operation of the charge pump.

17. The integrated circuit of claim 16, wherein the timing signals cause each latch to perform the isolation action during a different portion of a period of the clock signal.

18. The integrated circuit of claim 17, wherein the timing signals cause each latch to perform the latch action during a different portion of the period of the clock signal.

19. The integrated circuit of claim 16, wherein the charge pump includes an output for providing an output voltage, and wherein the outputs from the plurality of latches regulate a value of the output voltage of the charge pump.

20. The integrated circuit of claim 16, including a flash memory, wherein the output voltage of the charge pump writes to the flash memory.

* * * * *

UNITED STATES PATENT AND TRADEMARK OFFICE
CERTIFICATE OF CORRECTION

| | | |
|---|---|---|
| PATENT NO. | : 7,948,302 B2 | Page 1 of 1 |
| APPLICATION NO. | : 12/555227 | |
| DATED | : May 24, 2011 | |
| INVENTOR(S) | : Fernando Zampronho Neto et al. | |

It is certified that error appears in the above-identified patent and that said Letters Patent is hereby corrected as shown below:

Title Page item 57

In the ABSTRACT, line 4:

change "comparator (140)" to --comparator (104)--.

Col. 11, in claim 14, line 35:

change "at a different points" to --at different points--.

Col. 12, in claim 16, lines 18 to 19:

change "at a different points" to --at different points--.

Signed and Sealed this
Twelfth Day of July, 2011

David J. Kappos
*Director of the United States Patent and Trademark Office*